United States Patent
Innerebner et al.

(10) Patent No.: US 7,040,798 B2
(45) Date of Patent: May 9, 2006

(54) RING EXTRUDER FEED

(75) Inventors: Federico Innerebner, Zürich (CH); Achim Philipp Sturm, Oberuzwil (CH); Jürgen Schweikle, Niederhelfenschwil (CH)

(73) Assignee: Buhler AG, Uzwil (CH)

( * ) Notice: Subject to any disclaimer, the term of this patent is extended or adjusted under 35 U.S.C. 154(b) by 273 days.

(21) Appl. No.: 10/398,078

(22) PCT Filed: Jul. 9, 2001

(86) PCT No.: PCT/CH01/00430

§ 371 (c)(1),
(2), (4) Date: Aug. 18, 2003

(87) PCT Pub. No.: WO02/38359

PCT Pub. Date: May 16, 2002

(65) Prior Publication Data

US 2004/0027911 A1    Feb. 12, 2004

(30) Foreign Application Priority Data

Nov. 10, 2000  (DE)  .................................. 10055772

(51) Int. Cl.
*B29B 7/48*  (2006.01)
*B29B 7/60*  (2006.01)
*B29C 47/42*  (2006.01)

(52) U.S. Cl. ........................................ 366/76.3; 366/85

(58) Field of Classification Search .... 366/76.9–76.93, 366/76.1, 75, 83–85, 91, 297–301; 425/204, 425/208, 209

See application file for complete search history.

(56) References Cited

U.S. PATENT DOCUMENTS

| | | | | |
|---|---|---|---|---|
| 1,356,296 A | * | 10/1920 | La Casse | 366/76.4 |
| 2,550,226 A | * | 4/1951 | Colombo | 366/85 |
| 2,563,396 A | * | 8/1951 | Colombo | 425/204 |
| 2,581,451 A | * | 1/1952 | Sennet | 366/85 |
| 2,942,294 A | * | 6/1960 | Reifenhauser | 425/204 |
| 3,043,480 A | * | 7/1962 | Wittrock | 222/146.5 |
| 3,310,837 A | * | 3/1967 | Wittrock | 366/76.1 |
| 3,640,669 A | * | 2/1972 | Hanslik | 425/376.1 |
| 3,825,236 A | * | 7/1974 | Hussmann et al. | 366/76.1 |
| 3,929,322 A | * | 12/1975 | Hanslik | 366/85 |

(Continued)

FOREIGN PATENT DOCUMENTS

DE    2 303 366    7/1974

(Continued)

*Primary Examiner*—Charles E. Cooley
(74) *Attorney, Agent, or Firm*—Merchant & Gould P.C.

(57) ABSTRACT

The invention relates to a multi-screw extruder for the continuous treatment and/or processing of a bulk material, especially a product in powder, granular or flake form, comprising several shafts (3) which are arranged in a ring shape in a cavity (1) of an extruder housing (2) and which extend parallel to the axial direction (A) of the extruder. The extruder housing (2) is provided with axially parallel, concave segments (5a, 6a) of a circle on the radially inner (5) and radially outer (6) surfaces of the cavity (1). These circle segments act as a guide for the axially parallel shafts (3) with their processing elements (4) on the inside (5) or on the outside (6) of the shaft ring (3, . . . ). The inventive improvement lies in the radial extension of the axial partial area of the cavity (1) containing the shafts (3), which is located in the area of the feed opening (9), this radial extension (10b) extending along part of the shaft ring (3, . . . ) in the peripheral direction (U) of the same.

16 Claims, 9 Drawing Sheets

U.S. PATENT DOCUMENTS

| | | | |
|---|---|---|---|
| 4,125,208 A * | 11/1978 | Bettermann | 222/152 |
| 4,176,967 A * | 12/1979 | Brinkmann et al. | 366/83 |
| 4,192,617 A * | 3/1980 | Spielhoff | 366/83 |
| 4,268,176 A * | 5/1981 | Muller | 366/83 |
| 4,303,344 A * | 12/1981 | Muller | 366/76.3 |
| 4,535,940 A | 8/1985 | Geng | |
| 4,591,487 A * | 5/1986 | Fritsch | 422/134 |
| 4,686,088 A * | 8/1987 | Fritsch | 422/135 |
| 4,773,654 A * | 9/1988 | Fritsch | 277/348 |
| 4,889,430 A * | 12/1989 | Mueller | 366/85 |
| 5,020,916 A * | 6/1991 | Fritsch | 366/97 |
| 5,106,198 A * | 4/1992 | Muller | 366/75 |
| 5,108,711 A * | 4/1992 | Chszaniecki | 422/135 |
| 5,393,140 A * | 2/1995 | Blach | 366/75 |
| 5,429,435 A * | 7/1995 | Blach | 366/83 |
| 5,476,319 A * | 12/1995 | Blach | 366/83 |
| 5,510,073 A * | 4/1996 | Kaegi et al. | 264/211.23 |
| 5,836,682 A * | 11/1998 | Blach | 366/84 |
| 6,074,084 A * | 6/2000 | Kolossow | 366/84 |
| 6,190,031 B1 * | 2/2001 | Blach et al. | 366/75 |
| 6,196,711 B1 * | 3/2001 | Blach et al. | 366/83 |
| 6,838,496 B1 * | 1/2005 | Goedicke et al. | 523/343 |
| 2004/0027911 A1 * | 2/2004 | Innerebner et al. | 366/85 |
| 2004/0141405 A1 * | 7/2004 | Blach et al. | 366/85 |
| 2005/0001350 A1 * | 1/2005 | Innerebner et al. | 264/211.23 |
| 2005/0047267 A1 * | 3/2005 | Gneuss et al. | 366/83 |
| 2005/0048156 A1 * | 3/2005 | Sawa | 425/204 |
| 2005/0105382 A1 * | 5/2005 | Sturm et al. | 366/85 |

FOREIGN PATENT DOCUMENTS

| | | | |
|---|---|---|---|
| DE | 3430876 A1 * | 3/1986 | |
| DE | 4231231 C1 * | 8/1993 | |
| DE | 4231232 C1 * | 8/1993 | |
| DE | 19607666 C1 * | 7/1997 | |
| DE | 196 22 582 | 8/1997 | |
| DE | 19607663 A1 * | 9/1997 | |
| DE | 19644839 A1 * | 4/1998 | |
| DE | 198 47 103 | 10/1999 | |
| DE | 19812889 A1 * | 1/2000 | |
| DE | 19847102 C1 * | 1/2000 | |
| DE | 10020646 C1 * | 5/2001 | |
| DE | 10122462 C1 * | 10/2002 | |
| EP | 0635343 A1 * | 1/1995 | |
| EP | 0 995 565 | 4/2000 | |
| GB | 2175513 A * | 12/1986 | |
| GB | 2204524 A * | 11/1988 | |
| JP | 6-190898 * | 7/1994 | |
| JP | 6-320602 * | 11/1994 | |
| JP | 7-205256 * | 8/1995 | |
| WO | 97/31766 A2 * | 9/1997 | |
| WO | 97/31767 A2 * | 9/1997 | |
| WO | 02/30652 A1 * | 4/2002 | |
| WO | 02/38359 A1 * | 5/2002 | |
| WO | 02/090087 A2 * | 11/2002 | |
| WO | 03/020493 A1 * | 3/2003 | |
| WO | 03/033240 A1 * | 4/2003 | |
| WO | 03/070449 A1 * | 8/2003 | |
| WO | 2004/009327 A1 * | 1/2004 | |
| WO | 2004/087398 A2 * | 10/2004 | |
| WO | 2004/091889 A1 * | 10/2004 | |

* cited by examiner

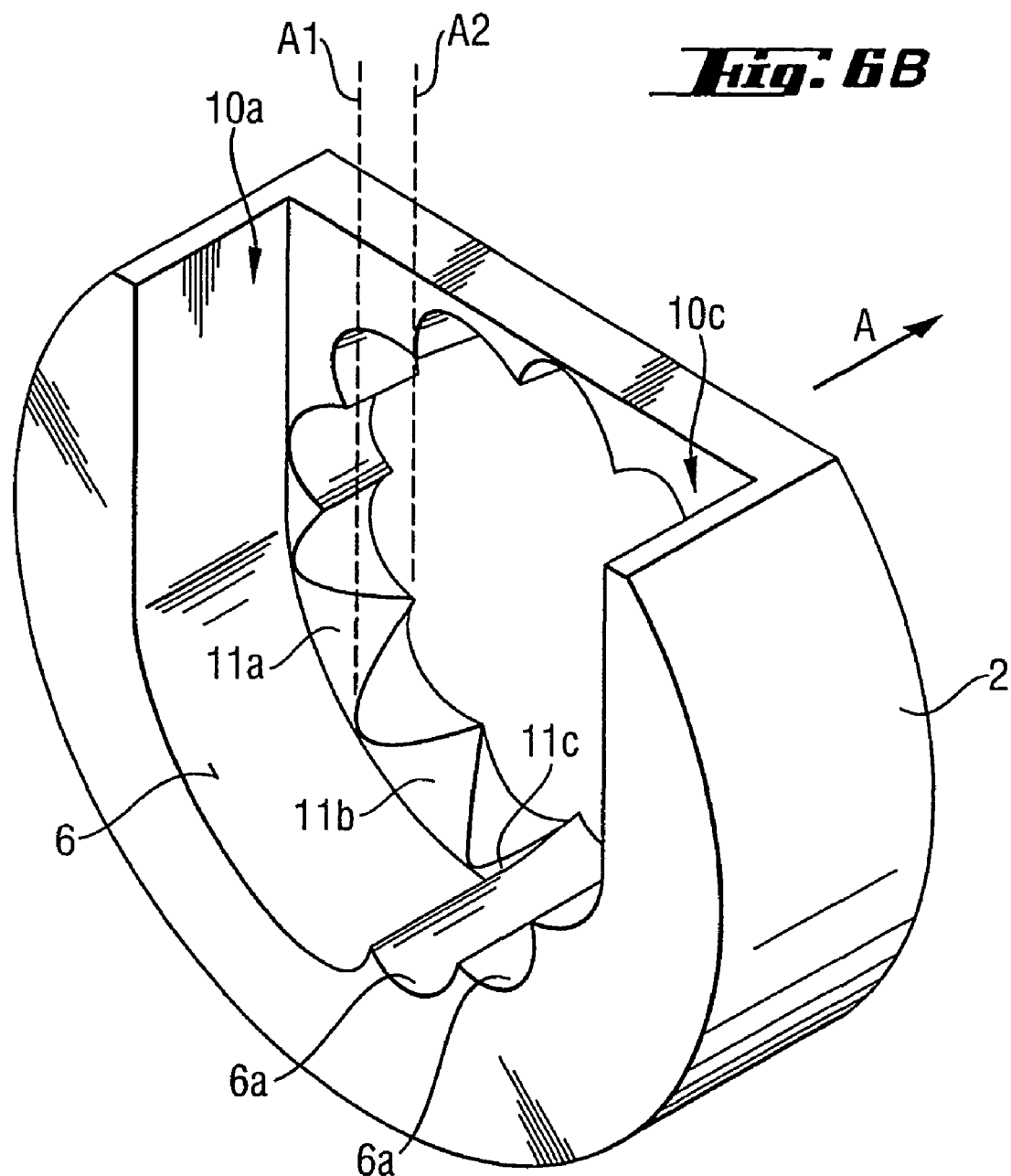

RING EXTRUDER FEED

FIELD OF TECHNOLOGY

This invention relates to a multi-screw extruder for continuously machining and/or molding bulk material.

BACKGROUND

Multi-screw extruder technology has established itself in recent years. Primarily extruders with several screws arranged in a ring or circle, which all each mesh with two adjacent screws, e.g., the 12-screw RingExtruder®, are characterized by particularly high throughputs and narrow retention time spectra. Bulk materials with a high apparent density, e.g., granules, are particularly advantageous for molding.

However, when the objective is to mold loose bulk material with a relatively low apparent density (approx. 20 to 60% of solids density), e.g., flocs or macerate, in such a multi-screw extruder, the problem becomes that the extruder feed opening is only able to draw in bulk material arriving in a loose bed with a high content of air with a low throughput at the feed opening. Means common in prior art, such as stuffing screws at the feed opening and/or degassing the extruder casing directly on the side opposite the conveying part of the feed opening, provide only an unsatisfactory solution. Therefore, these multi-screw extruders, which in themselves offer a very high throughput, are always "underfed" in the case of loose bulk material, e.g., polyethylene terephthalate (PET) flocs, which stem primarily from recycled bottles (RPET). Their feed opening is operationally limited for such loose bulk material.

SUMMARY

Therefore, the object of the invention in a multi-screw extruder mentioned at the outset with screws arranged in a ring or circle is to improve the feed performance in such a way that the possible throughput is approximately reached even given relatively loose bulk material, and an underfeeding of the extruder is largely avoided.

This object is achieved by the multi-screw extruder according to one embodiment of the present disclosure.

The radial expansion in the area of the feed port of the extruder allows most flocculent or macerated particles of the bulk material, in particular bottle RPET, to more readily get to the conveying and feeding worm elements in the feed zone, so that the worm elements can better seize and draw them in. In this way, far more flocs or macerate per unit of time can be drawn into the extruder.

The radial dilatation of the expansion at the feed port is preferably maximal, and narrows starting from the peripheral location on the screw circle where the feed port is located, along the periphery of the circle to a non-expanded peripheral location on the screw ring, where the conventional clearance is present between the screws of the screw ring and casing. In this way, a "feed pocket" is created outside and/or inside the circle between the screw circle and the radially external surface of the extruder cavity or between the screw ring and the radially internal surface of the extruder cavity, whose conveying cross section diminishes in the feeding process as the macerates/flocs become increasingly compressed, which brings about a considerable rise in the feed performance for loose bulk material.

Particularly advantageous is an extruder according to the invention that has screws rotating in the same direction, and in which the screw ring has a through opening at least in the area of the feed port between the internal ring section of the cavity and the external ring section of the cavity, and the expansion extends in the peripheral direction of the screw ring away from the feed port on both sides, wherein a first portion of the expansion extends between the radially internal side of the cavity and the screw ring (inner feed pocket), and a second portion of the expansion extends between the radially external side of the cavity and the screw ring (outer feed pocket), so that the surface of the machining elements of the identically rotating screws extending into the respective portion of the expansion during operation of the extruder moves in the narrowing direction of respective expansion. This design makes it possible to achieve a particularly high feed performance.

Instead of a relatively large through opening between the internal ring cavity and the external ring cavity, e.g., which is formed by omitting an entire screw at least in the feed zone, it may be sufficient to make the through opening out of sections of adjacent worm elements that do not tightly intermesh, at least in the area of the expansion.

As a result, at least bulk material compressed and melted further opposite the conveying side of the feed opening within the extruder can get from the radially external section of the cavity into the radially internal section of the cavity, thereby also increasing the fill level of the extruder.

It is also advantageous if the expansion along the periphery of the screw ring extends from the feed port on either side, and extends between the radially external side of the cavity and the screw ring (bilateral external pocket). Even though one of the two external pockets draws in less strongly than the other feed pocket with the "right" screw rotational direction only due to the gravity and, possibly, "stuffing force" acting on the bulk material and owing to the "false" rotational direction of the worm elements, it also makes a positive contribution to the overall feed performance, even if to a lesser extent.

In a particularly advantageous further development of the multi-screw extruder according to the invention, the radial dilatation of the expansion in the area of the feed port is maximal, and this expansion narrows from the axial location where the feed port is located, along the axial conveying direction of the extruder, up to a non-expanded axial location, where the conventional clearance between the screw ring and casing is again present. The at least one feed pocket is narrowed not just in the peripheral direction, but also in the axial conveying direction of the extruder. Since the worm elements act to draw in not just in the peripheral direction when seizing the flocs/macerate, but also convey, and hence feed, in the axial direction, this design makes it possible to achieve an optimal feed performance.

In particular, the radial expansion narrowing in the axial conveying direction consists of several individual segment expansions, which are each allocated to one of the circular segments, wherein the segment expansions are preferably designed in such a way that the narrowed areas between or next to the respective segment expansions are not expanded, and the individual segment expansions are largely separated from each other.

The segment expansions are best designed in such a way that the projection of the outside surface of the respective segment expansion has roughly the form of a sickle on a plane perpendicular to the axial direction, wherein the sickle surfaces consist of the differential surfaces between the outlines of the expanded extruder "flower" at the one axial location, and the outlines of the non-expanded extruder "flower" at the other axial location.

The segment expansions, i.e., their outside surfaces, are preferably designed in such a way that their largest radial expansion (relative to the midpoint of the respective screw in the segment expansion) extends in a radial direction twisted by an angle φ in the rotational direction of the screws relative to the radial direction R determined by the midpoint M of the extruder and the midpoint m of the respective screw. This angle φ lies between roughly 20° and 60°, preferably roughly between 30° and 50°. This angular shift causes the "leaves" of the respective "flower" (section of the outside surfaces of the segment expansions with a plane perpendicular to the axial direction) to be torn into "tears". This significantly increases the feed performance. It also makes sense for at least some of the narrowed areas to have an expanded narrowing in the peripheral area of the expansion.

All configurations specified above can be advantageously combined with a stuffing screw adapted to the multi-screw extruder and/or with vent holes provided at the extruder casing near the feed port, wherein a pressure under atmospheric pressure is preferably applied to the feed port.

BRIEF DESCRIPTION OF THE DRAWINGS

Additional advantages, features and possible applications of the invention can now be gleaned from the following description of preferred embodiments of the invention based on the drawing, which are not to be regarded as limiting. Shown on:

FIGS. 6A, 6B and 6C are different perspective views of the casing section of the feed zone of the multi-screw extruder according to the invention based on a fourth embodiment.

FIG. 1 is a cross section perpendicular to the axial conveying direction through a multi-screw extruder from prior art. This extruder has ten screws 3, which are arranged in a circle, and form a screw ring 3, . . . Each screw 3 carries with it rotationally fixed machining elements 4, e.g., worm elements or kneading elements (not shown). The screw ring 3, . . . is situated in a cavity 1 of the extruder casing 2. Both the radially inner lying surface 5 and the radially outer lying surface 6 of the cavity 1 contain recesses designed as cylinder jackets, which extend in the axial conveying direction of the extruder, and whose cross section resembles an inner lying circular segment 5a and an outer lying circular segment 6a. These recesses or circular segments 5a are used as a guide for the screws 3 provided with machining elements 4. The cavity 1 is divided by the screw ring 3, . . . into a inner-ring segment 1a and an outer-ring segment 1b.

FIG. 2 is a cross section through the multi-screw extruder from prior art from FIG. 1 in the area of its feed opening. The same reference numbers on FIG. 2 and FIG. 1 each relate to identical or corresponding elements. The feed port 9 extends in the peripheral direction over five of the total of ten screws 3, and in the axial direction (perpendicular to the drawing plane) typically over a stretch of about 1 to 3 screw windings, depending on the pitch of the windings. All screws 3 rotate in the same direction as denoted by the arrow D.

Figure 1:
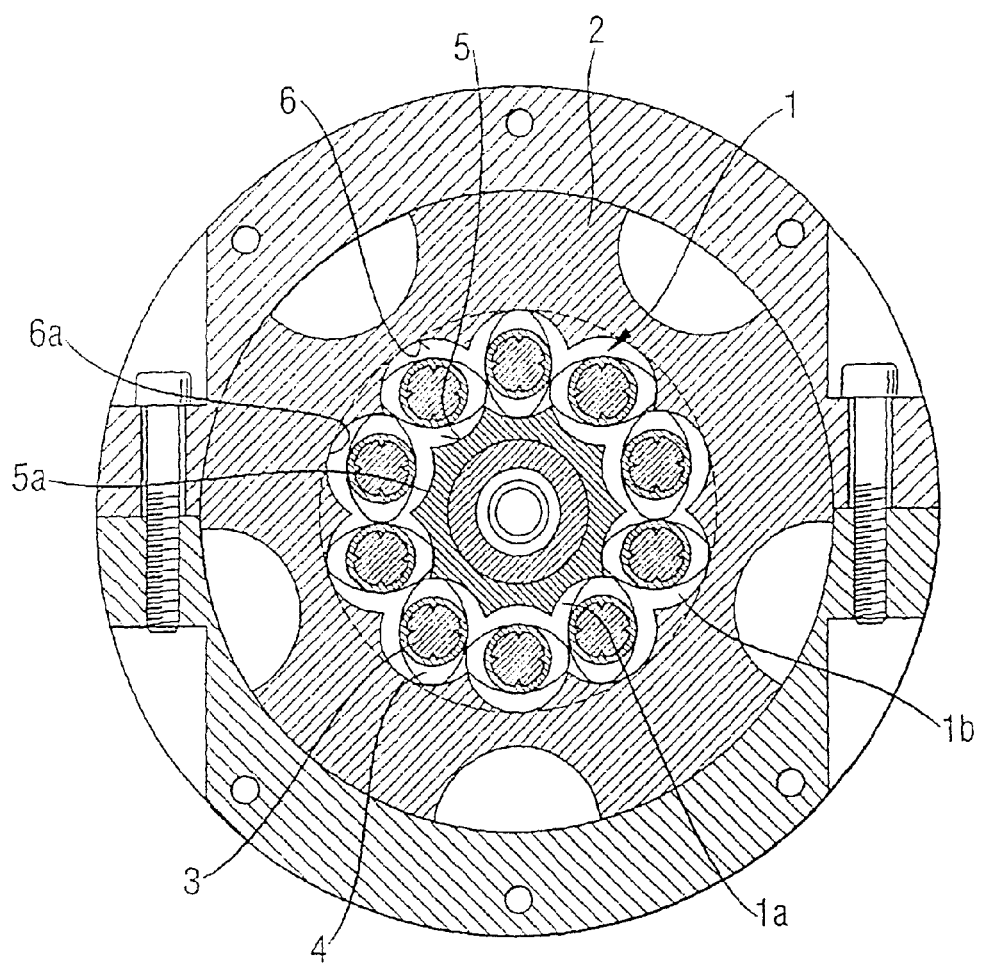
FIG. 1 is a cross section through a multi-screw extruder from prior art, perpendicular to its longitudinal axis.

If a bulk material is now supplied to the extruder via the feed port 9, it is drawn into the extruder cavity 1 adjacent in the axial direction by the rotating screws 3 with their worm elements (see FIG. 1). In bulk material with a high apparent density, e.g., grainy materials, the feed opening works satisfactorily. However, if the bulk material to be drawn in involves one of low apparent density, e.g., flocculent or porous material, whose flocs are still intertwined, this feed geometry of a multi-screw extruder from prior art will be able to draw in only a very inadequate quantity of material lying far below the throughput enabled by the cavity 1 and the number of screws 3. This "underfeeding" of the extruder arises in particular when macerates of recycled polyethylene terephthalate bottles (RPET) are recycled, and is especially disruptive, since only a fraction of the possible throughput can be processed.

Figure 2:
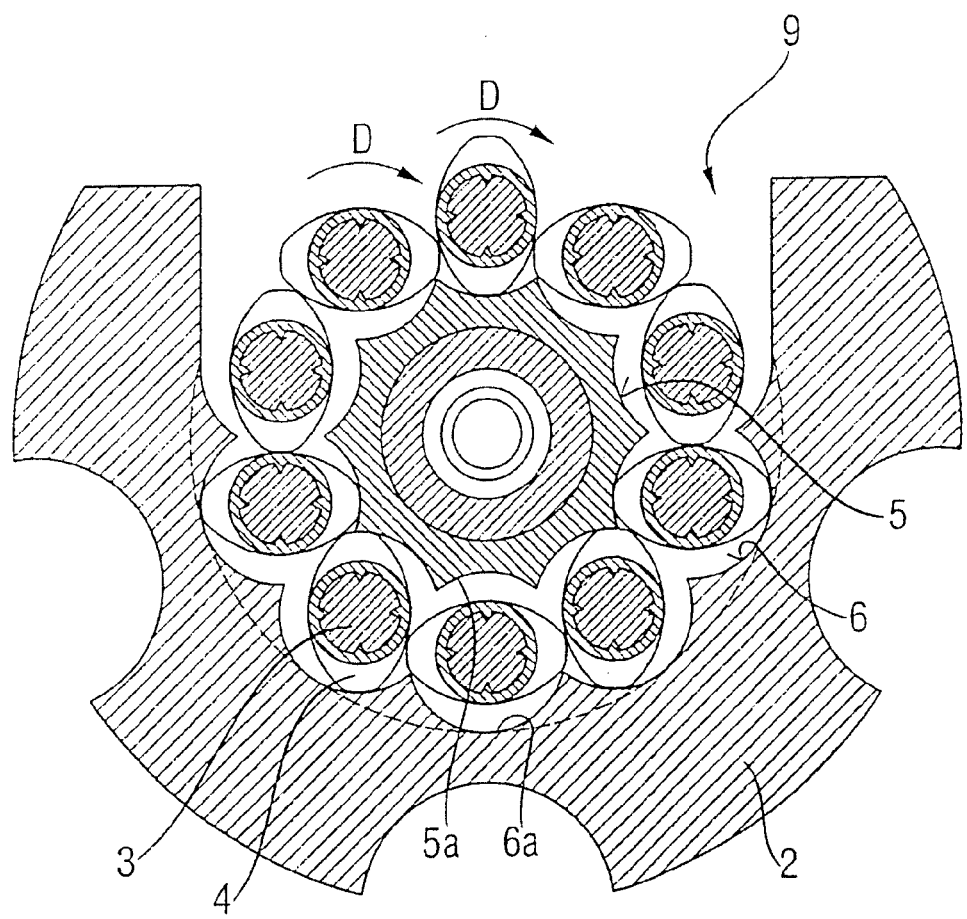
FIG. 2 is a cross section through the multi-screw extruder of FIG. 1 in the area of its feed opening according to prior art.
Figure 3:
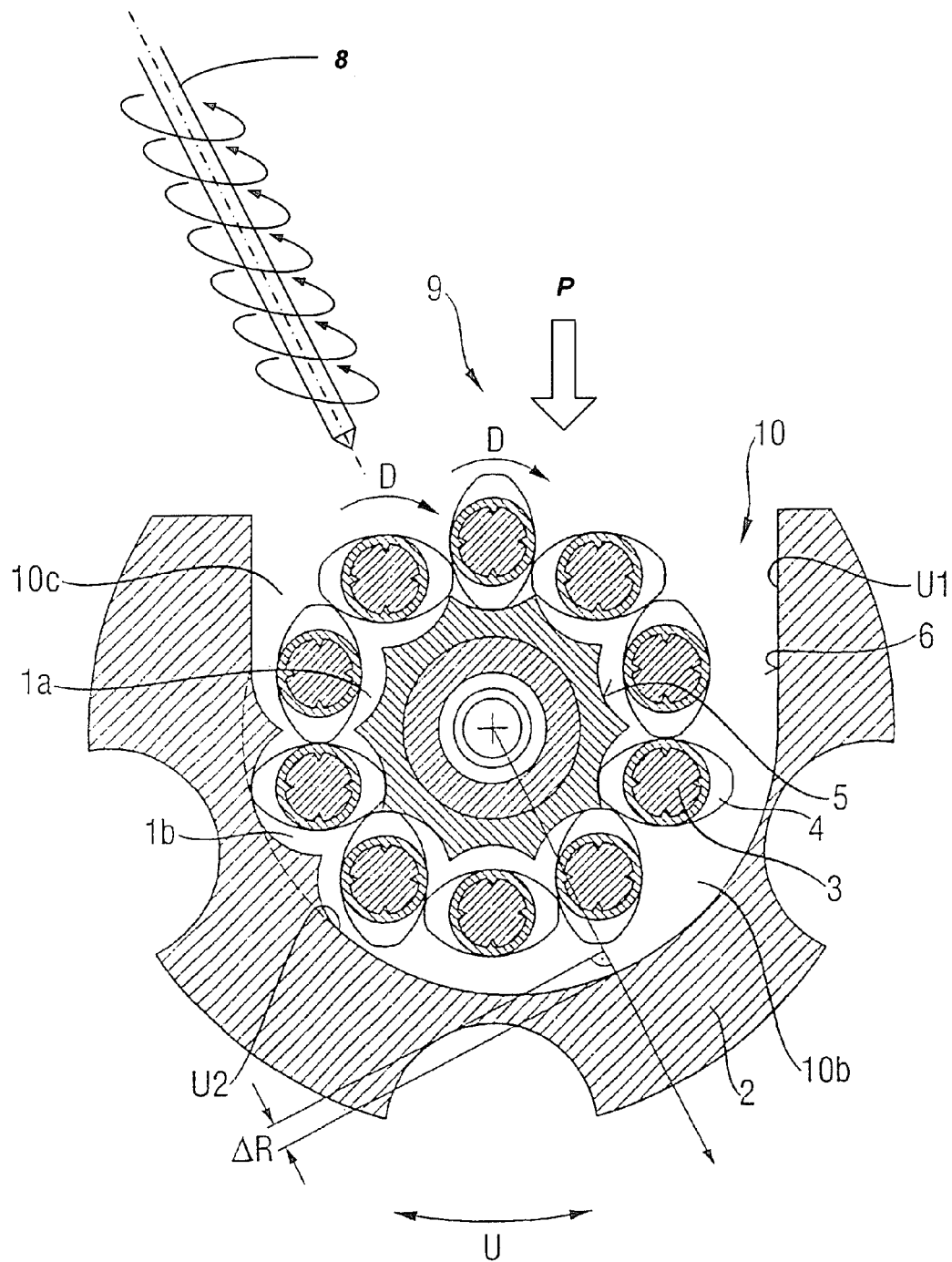
FIG. 3 is a cross-section analogous to FIG. 2 through a multi-screw extruder with a feed opening according to the first embodiment.

FIG. 3 is a cross-section analogous to FIG. 2 through the multi-screw extruder according to the invention based on a first embodiment. The identical reference numbers on FIG. 3 and preceding figures each relate to the same or corresponding elements. The feed port 9 is here expanded on one of its sides along the peripheral direction U, as opposed to prior art. This expansion 10 essentially consists of a section 10b lying radially outside the screw ring 3, . . . , which extends proceeding from a peripheral location U1 at the feed port along the peripheral direction U around nearly the entire screw ring 3, . . . up to a peripheral location U2 at which practically no more expansion is present. The expansion 10b is narrowed along the peripheral direction, i.e., its radial expansion ΔR tapers with increasing peripheral position between U1 and U2. This makes it possible to increase the feed performance of the extruder for the aforementioned flocculent or macerate bulk material, and satisfactory fill levels and throughputs are also achieved for such materials. In order to fill the internal ring section 1a of the cavity in addition to the external ring section 1b of the cavity 1 (see FIG. 1), the screws 3 that engage each other due to their machining elements 4 are not closely intermeshed. A pressure P under atmospheric pressure is preferably applied to the feed port 9. A stuffing screw 8 adapted to the multi-screw extruder is also shown in FIG. 3.

Figure 4:
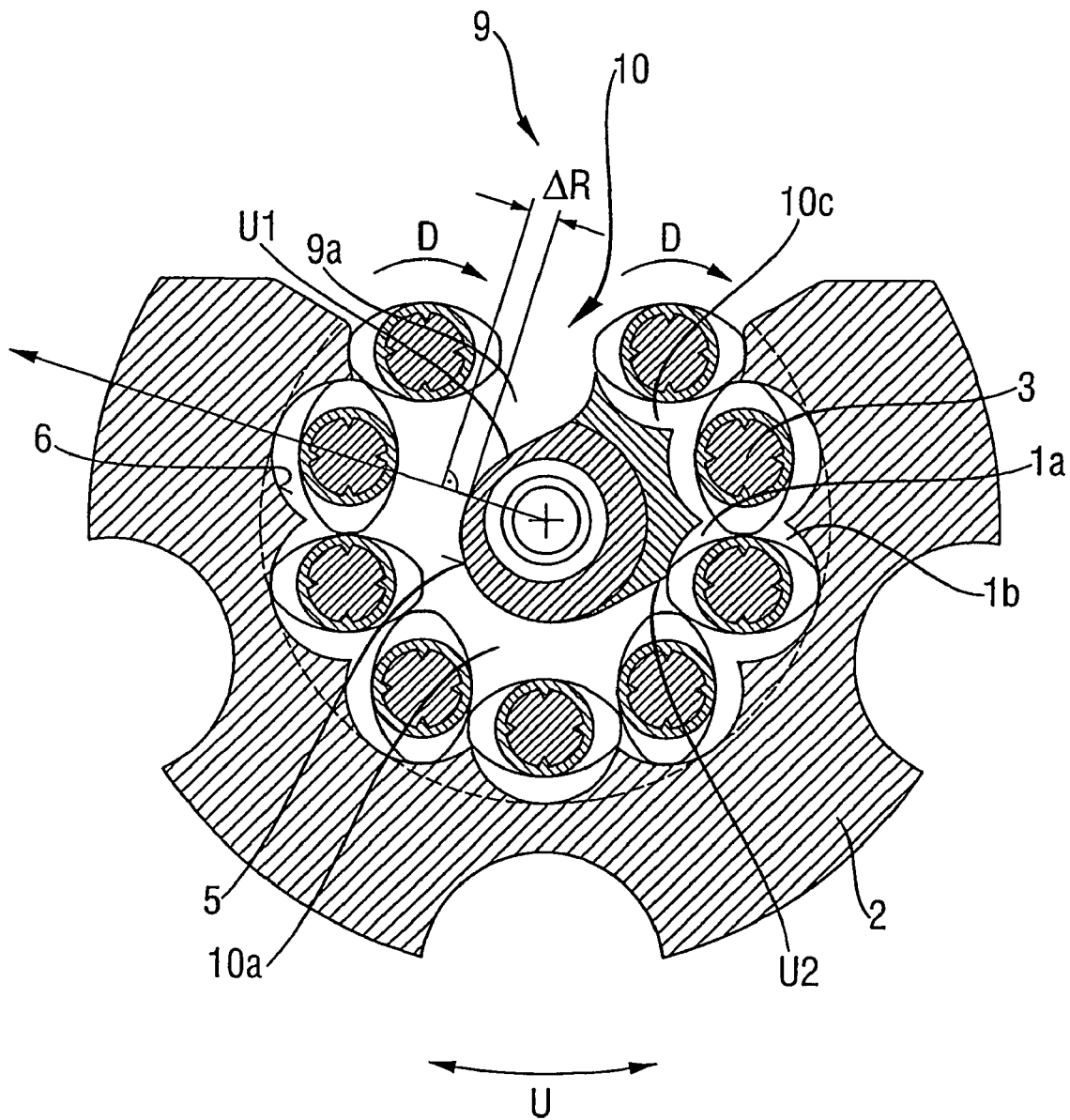
FIG. 4 is a cross-section analogous to FIG. 2 through a multi-screw extruder with a feed opening according to the second embodiment.

FIG. 4 is also a cross-section analogous to FIG. 2 through the multi-screw extruder according to the invention based on a second embodiment. The identical reference numbers on FIG. 4 and preceding figures again relate to respectively the same or corresponding elements. At least in the feed zone, where a screw is omitted, the feed port 9 is here connected with the internal ring side section 1a of the cavity 1, which is expanded along the peripheral direction U. The expansion 10 here essentially consists of a section 10a lying radially inside the screw ring 3, . . . , which also extends proceeding from a peripheral location U1 at the feed port along the peripheral direction U around nearly the entire screw ring 3, . . . up to a peripheral location U2 at which practically no more expansion is present. The expansion 10a is also narrowed along the peripheral direction, i.e., its radial expansion ΔR tapers with increasing peripheral position between U1 and U2. This design of the expansion also makes it possible to increase the feed performance of the extruder for the aforementioned flocculent or macerate bulk material, and in order to fill the internal ring section 1a of the cavity in addition to the external ring section 1b of the cavity 1 (see FIG. 1), the screws 3 that engage each other due to their machining elements 4 are not closely intermeshed.

Figure 5:
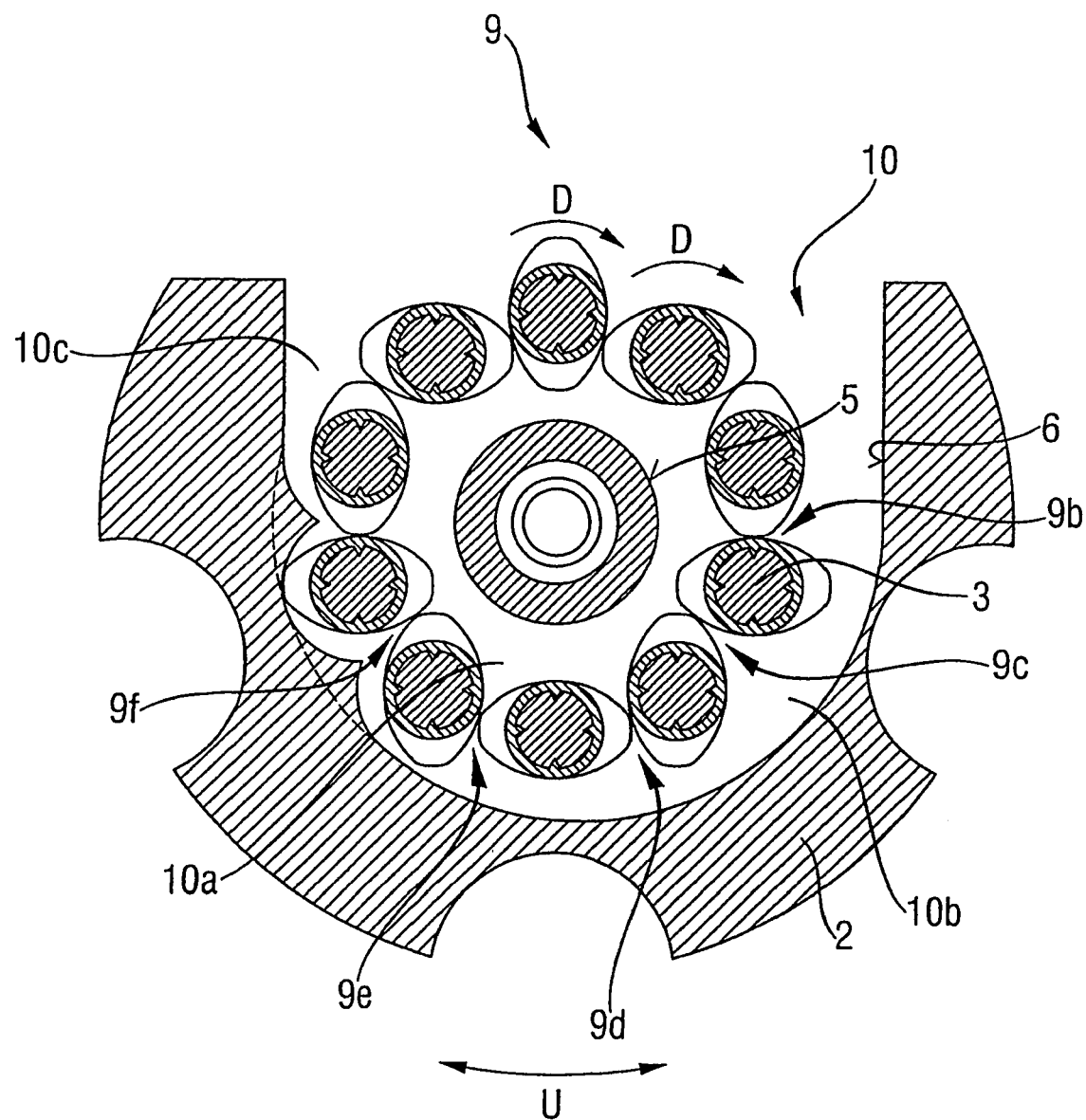
FIG. 5 is a cross-section analogous to FIG. 2 through a multi-screw extruder with a feed opening according to the third embodiment.

FIG. 5 is also a cross-section analogous to FIG. 2 through the multi-screw extruder according to the invention based on a third embodiment. The identical reference numbers on FIG. 5 and preceding figures again relate to respectively the same or corresponding elements. The external ring expansion 10b is designed as in the first embodiment, while the internal ring section 1a of the cavity 1 is additionally expanded to a feed pocket 10a, but one that has a constant radial expansion over the entire periphery U, as opposed to the feed pocket 10a of the second embodiment. The ten screws 3 of the screw ring 3, . . . are designed not to be closely intermeshed in the sections 9b, 9c, 9d, 9e and 9f, so that bulk material drawn in via the feed pocket 10b can gradually also get into the internal ring section 1a of the cavity after comminuted and/or melted.

In both the first, second and third embodiments, the partial sections 10a and/or 10b of the expansion 10 form a feed pocket, into which the loose bulk material to be introduced is drawn in due to the force of gravity, and primarily by the rotation D of the screws 3 accompanied by increasing compression. In addition to the "main feed zones" 10a or 10b, the "secondary feed zone" 10c contributes to the overall feed performance. The feed pockets 10a, 10b and 10c also have a narrowing (not shown) in the axial conveying direction (perpendicular to plane of projection). This also helps to increase feed performance.

FIGS. 6A, 6B, 6C and 6D show different views of the casing segment from the feed zone of the multi-screw extruder according to the invention based on a fourth embodiment of the invention. The core of the extruder and the screws are not shown. The identical reference numbers as in the preceding figures again relate to respectively the same or corresponding elements. As opposed to the first, second and third embodiments, the extruder of the fourth embodiment has twelve screws (not shown).

Figure 6A:
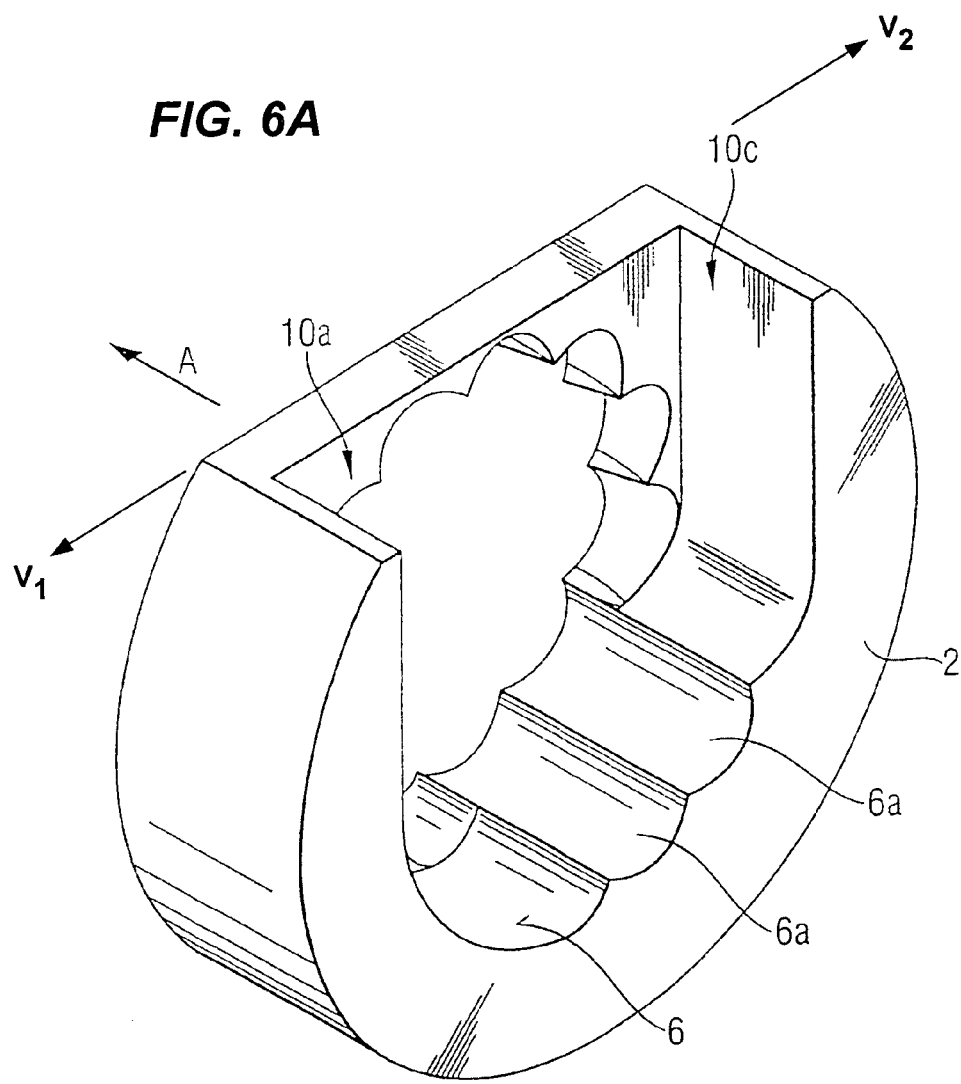

FIG. 6A shows a perspective view of the casing segment 2 for the feed zone of the 12-screw extruder. In the area of the "main feed pocket" 10a and "secondary feed pocket" 10c, more or less material is removed from the outer surface 6 of the cavity, so that a larger and a smaller feed pocket 10a, 10c are formed together with the screw ring (not shown). Except for two circular segments 6a of the outside surface 6 of the cavity, all other circular segments are "leveled". Vent holes $V_1$, $V_2$ are provided at the extruder casing 2 near the feed port 9.

FIG. 6B shows another perspective view of the casing segment 2 for the feed zone of the 12-screw extruder. In the area of the "main feed pocket" 10a and "secondary feed pocket" 10c, more or less material is removed from the outer surface 6 of the cavity, so that a larger and a smaller feed pocket 10a, 10c are formed together with the screw ring (not shown). As best visible from FIG. 6B, wedge expansions 11a, 11b and 11c are also provided in the axial direction A in addition to the expansions 10a and 10c in the peripheral direction U. This yields a narrowing of the corresponding circular segments of the outside surface 6, which extends between the axial location A1 and the axial location A2.

Figure 6C:
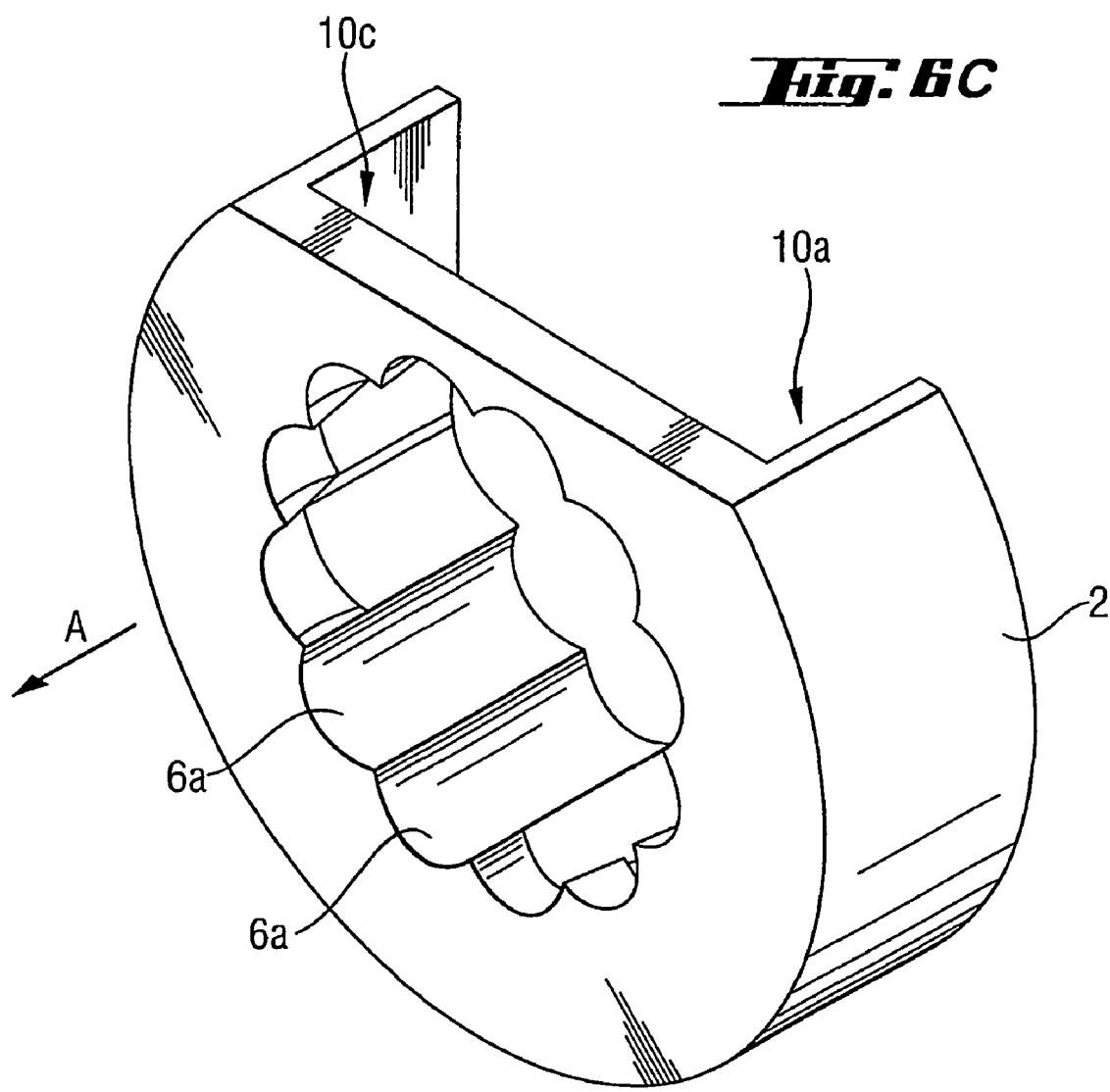
Figure 6D:
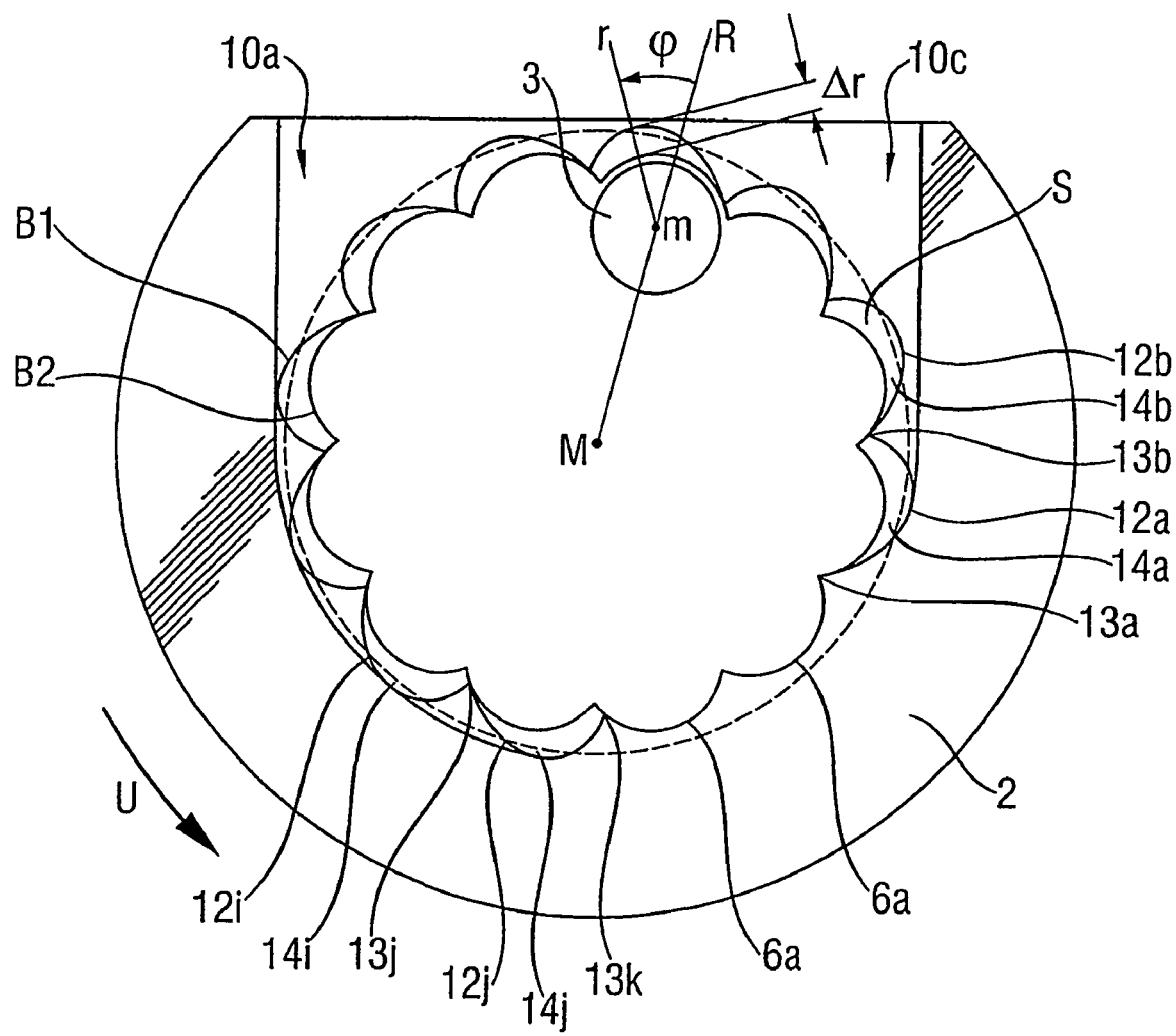
FIG. 6D is a view of the casing section from the feed zone of the multi-screw extruder according to the invention based on the fourth embodiment, as seen in the conveying direction of the extruder.

FIG. 6C is another perspective view of the casing segment 2 for the feed zone of the 12-screw extruder, and FIG. 6D presents an orthogonal view as seen in the extruder conveying direction A.

FIG. 6D shows the casing segment 2 in such a way that its "flower" formed by the edge lines of the numerous circular segments ("leaves") become clearly discernible. More precisely stated, the casing segment 2 has an expanded flower B1 (the edge line lying to the front on FIG. 6D) and an unexpanded flower B2 (the edge line lying to the back on FIG. 6D), between which the outer segment surfaces 14a, 14b, . . . , 14i, 14j of the segment expansions 12a, 12b, . . . , 12j are located. The wedge zones 13a, 13b, . . . , 13j, 13k by or between the segment expansions are not expanded in this configuration. The differential surface between the front flower B1 and the back flower B2 represents a sickle-shaped projection S of the outer segment surfaces in the area of the segment expansions.

To improve the feed performance, the segment expansions 12a, 12b, . . . , 12j are each designed in such a way that their greatest radial expansion Δr, relative to the midpoint m of the respective screw 3, extends in a radial direction r twisted by an angle φ in the rotational direction D of the screws 3 relative to the radial direction R determined by the midpoint M of the extruder and the midpoint m of the respective screw 3. As a result, the anterior flower B1 appears as a circle of "tears", or the projected "moon sickles" S appear somewhat distorted.

REFERENCE LIST

1 Cavity
1a Internal ring section of the cavity
1b External ring section of the cavity
2 Extruder casing
3 Screw
3, . . . Screw ring
4 Machining element
5 Inner lying surface of the cavity
5a Circular segment of the internal surface of the cavity
6 Outer lying surface of the cavity
6a Circular segment of the external surface of the cavity
9 Feed port
9a Through hole
9b Non-tightly intermeshed section
9c Non-tightly intermeshed section
9d Non-tightly intermeshed section
9e Non-tightly intermeshed section
9f Non-tightly intermeshed section
10 Expansion
10a Internal section of expansion
10b External section of expansion
11a Wedge expansion
11b Wedge expansion
11c Wedge expansion
12a Segment expansion
12b Segment expansion
12c Segment expansion
12d Segment expansion
12e Segment expansion
12f Segment expansion
12g Segment expansion
12h Segment expansion
12i Segment expansion
12j Segment expansion
13a Wedge zone
13b Wedge zone 13c Wedge zone
13d Wedge zone
13e Wedge zone
13f Wedge zone
13g Wedge zone
13h Wedge zone
13i Wedge zone
13j Wedge zone
13k Wedge zone
14a External segment surface
14b External segment surface
14c External segment surface
14d External segment surface
14e External segment surface
14f External segment surface
14g External segment surface
14h External segment surface
14i External segment surface
14j External segment surface
A Axial direction
U Peripheral direction
ΔR Radial dilatation of expansion
U1 Peripheral location at feed port
U2 Peripheral location without expansion
A1 Axial location at feed port
A2 Axial location without expansion
B1 Expanded flower
B2 Unexpanded flower
D Rotational direction of screws
ΔR Radial dilatation of expansion
Δr Radial dilatation of segment expansion
M Midpoint of extruder
m Midpoint of screw
φ Angular direction of dilatation Δr
S Sickle-shaped projection

The invention claimed is:

1. A multi-screw extruder for continuously machining and/or molding bulk material, the extruder comprising:
an extruder casing including:
a cavity, the cavity including a feed port proximate a first axial end of the cavity, and an outlet proximate a second axial end of the cavity; and
radially inner and radially outer lying surfaces of the cavity and axially parallel, concave circular segments; and
a plurality of screws running parallel to an axial direction of the extruder, the plurality of screws arranged in a screw ring inside a radially expanded axial area of the cavity, the radially expanded axial area being proximate the feed port, the radially expanded axial area extending along a portion of the screw ring in a peripheral direction of the screw ring, and narrowing from the first axial area where the feed port is situated, along the axial direction of the extruder, to an unexpanded axial area, the axially parallel screws guided by the concave circular segments, the machining elements of the screws proximate an inside or outside of the screw ring;
wherein each of the screws carries a number of axially consecutive machining elements, the machining elements intermeshing with adjacent screws, a portion of the machining elements being conveying elements.

2. The multi-screw extruder according to claim 1, wherein a radial dilatation of the expansion is at maximum proximate the feed port, and narrows proceeding from the peripheral portion of the screw ring where the feed port is located, along the periphery of the ring up to an unexpanded peripheral location on the screw ring.

3. The multi-screw extruder according to claim 2, wherein the extruder has screws rotating in the same direction, and the screw ring has a through hole proximate the feed port between an inner ring section of the cavity and an outer ring section of the cavity, and the expansion extends in the peripheral direction of the screw ring on either side away from the feed port wherein a first section of the expansion extends between the radially internal surface of the cavity and the screw ring, and a second section of the expansion extends between the radially external surface of the cavity and the screw ring so that the surface of the machining elements of the screws rotating in the same direction that extend into the respective section of the expansion move in the direction in which the respective expansion narrows during extruder operation.

4. The multi-screw extruder according to claim 3, wherein the through hole is formed by sections of adjacent machining elements that do not tightly intermesh, at least in the area of the expansion.

5. The multi-screw extruder according to claim 2, wherein the expansion extends along the periphery of the screw ring on either side away from the feed port, and extends between the radially outer surface of the cavity and the screw ring.

6. The multi-screw extruder according to claim 1, wherein the radial dilatation of the expansion is at maximum proximate the feed port.

7. The multi-screw extruder according to claim 6, wherein the radial expansion narrowing in the axial direction includes several individual segment expansions, each individual segment expansion being allocated to one of the circular segments.

8. The multi-screw extruder according to claim 7, wherein the segment expansions are configured so that wedge zones are not expanded between or next to the respective segment expansions.

9. The multi-screw extruder according to claim 8, wherein the segment expansions are configured so that the projection of the outer surface of the respective segment expansion has roughly the shape of a sickle in a plane perpendicular to the axial direction.

10. The multi-screw extruder according to claim 8, wherein the segment expansions are each configured so that their greatest radial expansion relative to the relative to the midpoint m of the respective screw extends in a radial direction twisted by a first angle in the rotational direction of the screws relative to the radial direction determined by the midpoint of the extruder and the midpoint m of the respective screw.

11. The multi-screw extruder according to claim 10, wherein the first angle lies roughly between 20° and 60°.

12. The multi-screw extruder according to claim 11, wherein the first angle lies roughly between 30° and 50°.

13. The multi-screw extruder according to claim 8, wherein at least some of the wedge zones have a wedge expansion in the peripheral area of the expansion.

14. The multi-screw extruder according to claim 8, wherein a stuffing screw is secured to the feed port.

15. The multi-screw extruder according to claim 8, wherein a pressure below atmospheric pressure can be applied to the feed port.

16. The multi-screw extruder according to claim 1, wherein the extruder casing has ventilation holes near the feed port.

* * * * *